United States Patent [19]
Bertelli et al.

[11] 3,850,218
[45] Nov. 26, 1974

[54] PNEUMATIC TIRE FOR VEHICLE WHEELS

[75] Inventors: Italo Bertelli; Giorgio Tangorra, both of Milan, Italy

[73] Assignee: Industrie Pirelli S.p.A., Milano, Italy

[22] Filed: Mar. 26, 1973

[21] Appl. No.: 345,068

[30] Foreign Application Priority Data
Mar. 28, 1972  Italy .................................. 22464/72

[52] U.S. Cl. ...... 152/353 C, 152/330 R, 152/361 R
[51] Int. Cl. ........ B60c 17/00, B60c 9/02, B60c 9/18
[58] Field of Search ........... 152/330, 352, 353, 354, 152/361 R

[56] References Cited
UNITED STATES PATENTS

| | | | |
|---|---|---|---|
| 595,422 | 12/1897 | Van Zandt | 152/353 |
| 597,569 | 1/1898 | Van Zandt | 152/353 |
| 1,337,660 | 4/1920 | Killen | 152/353 |
| 1,462,984 | 7/1923 | Schenuit | 152/352 |
| 2,146,942 | 2/1939 | Czerwin | 152/353 |
| 3,253,635 | 5/1966 | Travers | 152/354 |
| 3,400,746 | 9/1968 | Heimovics, Jr. | 152/353 |

FOREIGN PATENTS OR APPLICATIONS

| | | | |
|---|---|---|---|
| 313,649 | 6/1929 | Great Britain | 152/353 |

*Primary Examiner*—Drayton E. Hoffman
*Attorney, Agent, or Firm*—Clelle W. Upchurch

[57] ABSTRACT

A pneumatic tire for vehicle wheels having two sidewalls in which each is provided with at least one hinge, a section midline whose concavity is directed outwardly and grooves on at least one of the two surfaces of a sidewall. The grooves may form with radial planes angles not greater than 45° with the ratio between the depth of the grooves at a stated point and the thickness of the sidewall at the same point not exceeding a value of 0.3 at the hinges and 0.5 at the point of maximum thickness of the sidewall.

9 Claims, 4 Drawing Figures

PNEUMATIC TIRE FOR VEHICLE WHEELS

The present invention relates to pneumatic tires for vehicle wheels and, more precisely the sidewalls of the tires.

In copending U.S. Pat. application No. 273,337, now U.S. Pat. No. 3,805,868, there is described a pneumatic tire which comprises a tread provided with an annular inextensible structure and two sidewalls, whose section midline has a concavity directed outwardly. The sidewalls of the tire comprise moreover at least one portion, and preferably two portions, whose resistance to flexion is smaller than that of the remaining sidewall portions and which are called "hinges."

The tire described in copending U.S. Pat. application No. 272,337, now U.S. Pat. No. 3,805,868, possesses the feature that its sidewalls work under compression, and this because each sidewall is practically locked against two fixed points, respectively constituted by the edge of the annular inextensible structure and by the rim, which prevent it from reversing its sense of curvature. On account of said feature, the tire sidewalls can also be constituted by homogeneous material, as for instance a rubber compound, devoid of any reinforcing means of the type normally used in conventional tires (for instance cord fabric).

In the tires according to copending U.S. Pat. application No. 273,337, now U.S. Pat. No. 3,805,868, it sometimes is advisable to impart anisotropy characteristics to the sidewalls, and this in order to influence in the desired direction and extent their conditions of deformation or stress.

The present invention aims at indicating some ways to confer anisotropy to the sidewalls.

Accordingly it is an object of the present invention to provide a pneumatic tire for vehicle wheels having two sidewalls, each of which is provided with at least one hinge and has a section midline whose concavity is directed outwardly with grooves on at least one of the two surfaces of a sidewall.

Preferably, the grooves are directed along radial planes. However, it is also possible to arrange them in a direction inclined at an angle not greater than 45°. In any case, when the grooves have an inclined direction, the entity of said inclination and the pitch between two subsequent grooves are such that a radial plane intersects not more than three grooves.

The grooves can be present on the inner surface of the sidewalls or on the outer surface, or on both. In the latter case, the outer grooves can be appropriately offset with respect to the inner grooves and, to obtain this, all of the grooves (both the inner ones and the outer ones) are preferably parallel to one another, namely are all situated on radial planes or are inclined at angles having equal value and direction.

In order to influence in the desired way the mechanical characteristics of the sidewall, the grooves can have a depth and a width variable along their development. In particular, the ratio between the depth of a groove at a stated point and the sidewall thickness at the same point (groove included) does not exceed a value of 0.3 at the hinges and a value of 0.5 at the point of maximum thickness of the sidewall itself.

It also is clear that the mechanical characteristics of the sidewall are affected, not only by the width and depth of the grooves but also by their pitch, namely by the volume of the material "lacking" for the presence of the grooves in comparison with the total volume which the sidewall would have along a preestablished circumferential line in the absence of the grooves. The ratio, expressed in percentage, is indicated herebelow as the "volume percentage of the grooves." It, too, can be different in the various points of the sidewalls, but does not exceed 15 percent at the hinges and 30 percent at the point of maximum thickness of the sidewall.

The above indicated arrangements, besides ensuring the desired technical effect, namely a control of the deformations and stresses of the sidewall, have also a favorable influence as regards absorbed power, since the rolling resistance of the tire is reduced. Moreover, when the grooves are provided also on the outer surface, a better cooling of the tire is obtained.

Since the sidewalls do not require the presence of tension-resistant reinforcing structures the tires may be obtained by means of a simple pouring or injection molding process, or the like.

The invention will now be better described with reference to the attached drawings, given by way of non-limiting example, in which.

Figure 1:
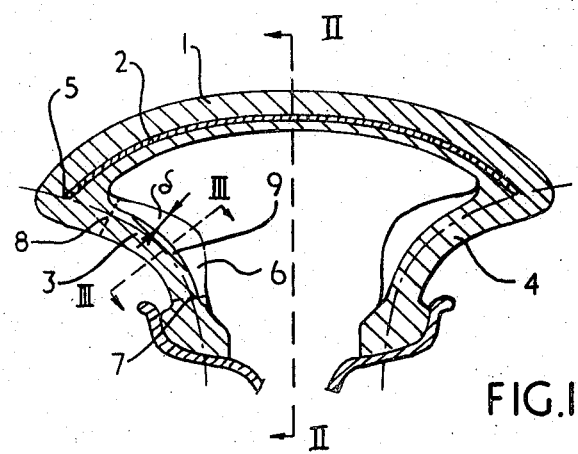
FIG. 1 represents in cross-section a tire according to the present invention.

FIG. 1 illustrates a pneumatic tire according to the present invention which comprises a tread 1 provided with an annular inextensible structure 2, and two sidewalls 3 and 4.

Each sidewall has a section midline 5 which is curved and has a concavity directed outwardly even under the action of the normal inflation pressure.

Figure 2:
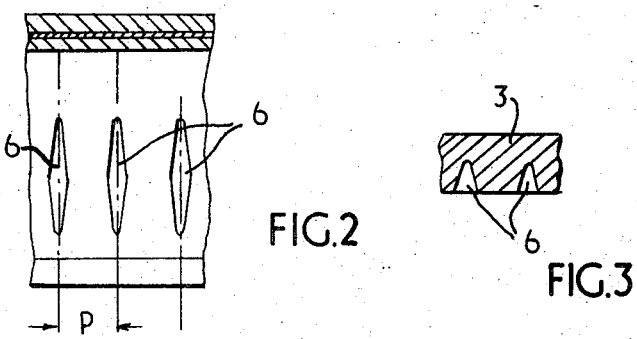
FIG. 2 represents a partial section taken along plane II—II of FIG. 1.
Figure 3:
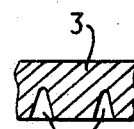
FIG. 3 represents a partial section taken along plane III—III of FIG. 1.

FIGS. 1 and 2 represent also grooves 6 which, in the illustrated example, have a rhombic shape, but which could have a quite different shape. The grooves 6 are directed along radial planes and, as it can be seen in FIG. 3, have a practically triangular section. Moreover, their depth $\delta$ is variable from point to point along their development. It is minimum at the hinges 7 and 8 and maximum at portion 9, where the sidewall has its maximum thickness.

In particular, in the illustrated example, the ratio between the depth of the groove and the total thickness of the sidewall is of approximately 0.15 at the hinges and of 0.47 at the point of maximum thickness of the sidewall. In the same portions the volume percentage of the grooves is 0.025 percent and 0.17 percent, respectively.

Figure 4:
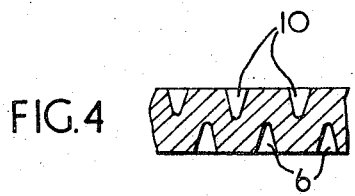
FIG. 4 represents a section analogous to that of FIG. 3 according to an alternative embodiment of the present invention.

FIG. 4 illustrates an alternative embodiment in which, besides the grooves 6 provided on the inner surface of the sidewall, there are grooves 10 provided on its outer surface.

The section of the grooves 10 is substantially triangular, analogously to that of the grooves 6. Moreover, both the grooves 6 and the grooves 10 are directed along radial planes and are offset with respect to one another along the circumferential line; in other words, each groove 10 is comprised between two grooves 6.

In this alternative embodiment, it is possible to obtain also a better cooling of the sidewall by virtue of the grooves 10 which allow the heat generated inside the sidewall to be more easily dissipated to the outside along the surfaces of the grooves 10.

It is understood that the above reported examples are not limiting in character and that the scope of protection of the present invention includes any other alternative embodiment based on the above indicated inventive principle.

What is claimed is:

1. A pneumatic tire for vehicle wheels comprising a reinforced tread having a given width and side edges and two sidewalls made of elastomeric material, extending from said tread side edges and terminating in beads for a rigid wheel rim, said given width of the tread being wider than any other part of the tire and being reinforced over substantially the whole of its width by an annular structure which is substantially inextensible under the tire inflation pressure in both its circumferential and lateral directions, said annular structure extending to at least the midline of said sidewalls, said sidewalls having a cross-sectional shape whose midline, over substantially the whole length between said edges of the tread reinforcement and the bead, is convex with respect to the interior of the tire under the tire inflation pressure, each of said sidewalls having in combination a bending stiffness, curvature and thickness sufficient to constrain the sidewall between said side edges of the inextensible tread reinforcement and the bead seat on the wheel rim, whereby on inflation of the tire and under service conditions the sidewalls are placed under compression stress, said sidewalls having at least one end zone with a bending stiffness lower than the stiffness of the remaining zone, wherein at least on one of the surfaces of one sidewall grooves are present, whose direction forms an angle not greater than 45° with the radial planes of the tire, the pitch and the size of said grooves defining a plurality of ribs along which propagate the stresses exerted on said sidewalls.

2. The tire of claim 1, in which when the grooves are inclined with respect to the radial planes, each radial plane intersects not more than three grooves.

3. The tire of claim 1, in which the grooves are present only on the inner surface of the sidewalls.

4. The tire of claim 1, in which the grooves are present both on the inner surface and on the outer surface of the sidewalls.

5. The tire of claim 4, in which all of the grooves are substantially parallel to one another and the outer grooves are offset along the circumference with respect to the inner grooves.

6. The tire of claim 1, in which the depth of said grooves is variable along their development.

7. The tire of claim 1, in which the width of the grooves is variable along their development.

8. The tire of claim 1, in which the ratio between the depth of the grooves at a stated point and the thickness of the sidewall at the same point does not exceed a value of 0.3 at the hinges and of 0.5 at the point of maximum thickness of the sidewall.

9. The tire of claim 1, in which the volume percentage of the grooves does not exceed 15 percent at the hinges and 30 percent at the point of maximum thickness of the sidewall.

* * * * *